United States Patent
Li et al.

(10) Patent No.: US 11,997,673 B2
(45) Date of Patent: May 28, 2024

(54) NEGATIVE-BLOCK ACK BASED WI-FI MAC PROTOCOL

(71) Applicant: Apple Inc., Cupertino, CA (US)

(72) Inventors: Guoqing Li, Cupertino, CA (US); Yoel Boger, Shoham (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/009,895

(22) Filed: Sep. 2, 2020

(65) Prior Publication Data

US 2021/0076402 A1 Mar. 11, 2021

Related U.S. Application Data

(60) Provisional application No. 62/897,109, filed on Sep. 6, 2019.

(51) Int. Cl.
*H04W 72/1273* (2023.01)
*H04L 1/1607* (2023.01)
*H04L 5/00* (2006.01)
*H04W 52/02* (2009.01)
*H04W 74/0833* (2024.01)

(52) U.S. Cl.
CPC ....... *H04W 72/1273* (2013.01); *H04L 1/1614* (2013.01); *H04L 5/0055* (2013.01); *H04W 52/0216* (2013.01); *H04W 52/0229* (2013.01); *H04W 74/0833* (2013.01)

(58) Field of Classification Search
CPC ......... H04W 72/1273; H04W 52/0216; H04W 52/0229; H04W 74/0833; H04L 1/1614; H04L 5/0055; H04L 1/1854; H04L 2001/0093; Y02D 30/70
See application file for complete search history.

(56) References Cited

U.S. PATENT DOCUMENTS

| | | |
|---|---|---|
| 9,100,459 B2 | 8/2015 | Lin et al. |
| 10,355,828 B2 | 7/2019 | Vajapeyam et al. |
| 2005/0207354 A1* | 9/2005 | Nekovee ............... H04L 1/1848 370/260 |
| 2007/0263631 A1* | 11/2007 | Mallory ............... H04L 1/1841 370/394 |

(Continued)

*Primary Examiner* — Omer S Mian
(74) *Attorney, Agent, or Firm* — Kowert, Hood, Munyon, Rankin & Goetzel, P.C.

(57) ABSTRACT

Methods for performing negative acknowledgements (NACKs) in a Wi-Fi based network may include a wireless device receiving, from a neighboring wireless device, a transmission schedule associated with receipt of data packets from the neighboring wireless device. The transmission schedule may include a timeout period associated with transmission of the data packets and/or a start time of the transmission schedule. The method may also include the wireless device determining an error condition associated with the data packets. The error condition may be, for example, non-receipt of any packet (e.g., data packets and/or non-data packets) prior to expiration of the timeout period and/or detection of a gap in sequence numbers associated with the data packets. The method may further include the wireless device, based on the error condition, transmitting a NACK. The NACK may be (or include) a negative block ACK (N-BA) bitmap indicating which data packets were not successfully received.

20 Claims, 10 Drawing Sheets

(56) References Cited

U.S. PATENT DOCUMENTS

| | | |
|---|---|---|
| 2008/0144493 A1 | 6/2008 | Yeh |
| 2008/0219226 A1* | 9/2008 | Oishi ............... H04L 47/10 370/338 |
| 2009/0067362 A1* | 3/2009 | Doppler ............ H04L 1/1607 370/315 |
| 2010/0183027 A1* | 7/2010 | Mueller ............ H04L 1/0025 370/468 |
| 2011/0096681 A1* | 4/2011 | Singh ............... H04L 69/32 370/252 |
| 2011/0096710 A1* | 4/2011 | Liu ................. H04L 1/1628 370/312 |
| 2012/0224546 A1* | 9/2012 | Chang .............. H04W 76/14 370/329 |
| 2013/0272288 A1* | 10/2013 | Li ................... H04L 5/0091 370/338 |
| 2014/0112225 A1* | 4/2014 | Jafarian ........... H04W 52/0235 370/311 |
| 2015/0049709 A1* | 2/2015 | Damnjanovic ...... H04L 5/0055 370/329 |
| 2015/0139156 A1* | 5/2015 | Thakur ............ H04W 40/005 370/329 |
| 2016/0029389 A1* | 1/2016 | Merlin ............. H04W 74/04 370/329 |
| 2016/0219522 A1* | 7/2016 | Asterjadhi ........ H04W 28/0221 |
| 2016/0360443 A1* | 12/2016 | Hedayat ........... H04B 7/0452 |
| 2017/0048879 A1* | 2/2017 | Zhang .............. H04W 16/14 |
| 2017/0055300 A1* | 2/2017 | Pitchaiah .......... H04W 76/11 |
| 2017/0230149 A1* | 8/2017 | Wang ............... H04L 1/1664 |
| 2017/0257888 A1* | 9/2017 | Kneckt ............. H04W 74/0816 |
| 2017/0310448 A1* | 10/2017 | Kim ................. H04L 5/0055 |
| 2017/0311310 A1* | 10/2017 | Ryu ................. H04L 1/1614 |
| 2018/0279209 A1* | 9/2018 | Fang ................ H04L 5/0082 |
| 2019/0306790 A1* | 10/2019 | Kottontavida .... H04W 28/0284 |
| 2019/0364492 A1 | 11/2019 | Azizi et al. |
| 2020/0137734 A1* | 4/2020 | Chun ............... H04L 27/26 |
| 2020/0221381 A1* | 7/2020 | Homchaudhuri ..... H04W 80/02 |
| 2021/0058862 A1* | 2/2021 | Choo ................ H04W 52/0216 |
| 2021/0385876 A1* | 12/2021 | Ahn ................. H04W 52/0216 |
| 2023/0020559 A1* | 1/2023 | Asterjadhi ........ H04L 1/1621 |

\* cited by examiner

| BA Type | BlockAck frame variant |
|---|---|
| 0 | Basic |
| 1 | Extended Compressed |
| 2 | Compressed |
| 3 | Multi-TID |
| 4 | Negative BA |
| 5 | Reserved |
| 6 | GCR |
| 7-9 | Reserved |
| 10 | GLK-GCR |
| 11 | Multi-STA |
| 12-15 | Reserved |

FIG. 6A

| BA Type | BlockAck frame variant |
|---|---|
| 0 | Basic |
| 1 | Extended Compressed |
| 2 | Compressed |
| 3 | Multi-TID |
| 4 | Reserved |
| 5 | Negative BA |
| 6 | GCR |
| 7-9 | Reserved |
| 10 | GLK-GCR |
| 11 | Multi-STA |
| 12-15 | Reserved |

FIG. 6B

NEGATIVE-BLOCK ACK BASED WI-FI MAC PROTOCOL

PRIORITY DATA

This application claims benefit of priority to U.S. Provisional Application Ser. No. 62/897,109, titled "Negative-Block ACK Based Wi-Fi MAC Protocol", filed Sep. 6, 2019, by Guoqing Li and Yoel Boger, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (and/or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (and/or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (and/or UE for short). Some wireless client devices are also collectively referred to herein as mobile devices or mobile stations (although, as noted above, wireless client devices overall may be stationary devices as well).

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

SUMMARY

Embodiments described herein relate to a negative block acknowledgement mechanism for a Wi-Fi protocol.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, a wireless device may transmit, to a neighboring wireless device, data packets based on a transmission schedule. The transmission schedule may include a timeout period associated with transmission of the data packets and/or a start time of the transmission schedule. The wireless device may receive, from the neighboring wireless device, a negative acknowledgement (NACK). The NACK may be based on an error condition such as non-receipt of the any packet (e.g., data packets and/or non-data packets a QoS null packet, and/or a block ACK request packet) prior to expiration of the timeout period and/or detection of a gap in sequence numbers associated with the data packets. In some embodiments, the NACK may be (or include) a negative block ACK (N-BA) bitmap indicating which data packets were not successfully received.

In some embodiments, a wireless device may receive, from a neighboring wireless device, a transmission schedule associated with receipt of data packets from the neighboring wireless device. The transmission schedule may include a timeout period associated with transmission of the data packets and/or a start time of the transmission schedule. The wireless device may determine an error condition associated with the data packets. The error condition may be, for example, non-receipt of any packet (e.g., data packets and/or non-data packets a QoS null packet, and/or a block ACK request packet) prior to expiration of the timeout period and/or detection of a gap in sequence numbers associated with the data packets. The wireless device may, based on the error condition, transmit a NACK. In some embodiments, the NACK may be (or include) a negative block ACK (N-BA) bitmap indicating which data packets were not successfully received.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 6A and 6B illustrate examples of a BA type parameter for indicating an N-BA, according to some embodiments.

Figure 1A:
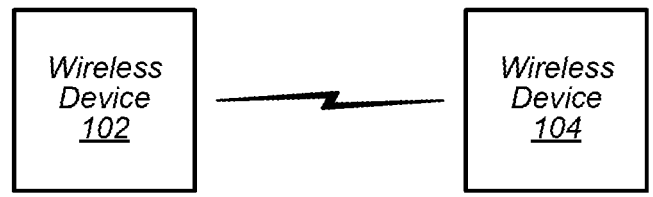
FIG. 1A illustrates an example wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
STA: Wireless Station
TX: Transmission/Transmit
RX: Reception/Receive
LAN: Local Area Network
WLAN: Wireless LAN
RAT: Radio Access Technology
AKC: Acknowledgment
BA: Block Acknowledgment
NAKC: Negative Acknowledgment
N-BA: Negative Block Acknowledgment
TWT: Target Wakeup Time
QoS: Quality of Service
CTS: Clear to Send
ADDBA: Add Block ACK

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (and/or combination of devices) having at least one processor that executes instructions from a memory medium.

Mobile Device (and/or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (and/or combination of devices) which is easily transported by a user and capable of wireless communication using WLAN or Wi-Fi.

Wireless Device (and/or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (and/or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
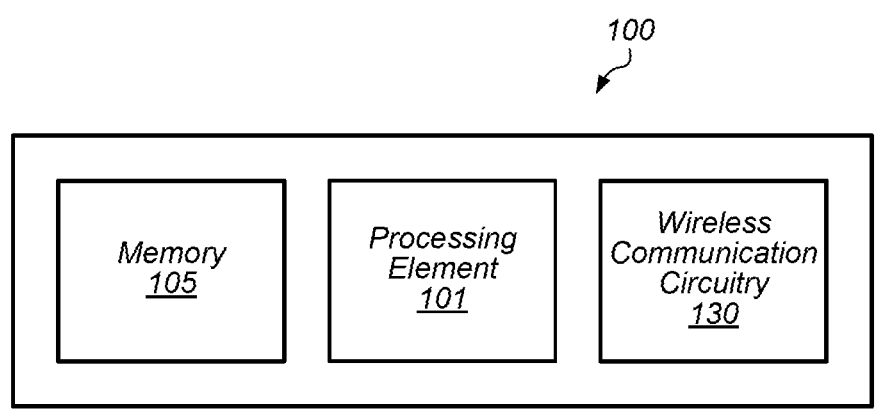
FIG. 1B illustrates an example simplified block diagram of a wireless device, according to some embodiments.

FIGS. 1A-1B—Wireless Communication System

FIG. 1A illustrates an exemplary (and simplified) wireless communication system in which aspects of this disclosure may be implemented. It is noted that the system of FIG. 1A is merely one example of a possible system, and embodiments of this disclosure may be implemented in any of various systems, as desired.

As shown, the exemplary wireless communication system includes a ("first") wireless device 102 in communication with another ("second") wireless device. The first wireless device 102 and the second wireless device 104 may communicate wirelessly using any of a variety of wireless communication techniques, potentially including ranging wireless communication techniques.

As one possibility, the first wireless device 102 and the second wireless device 104 may perform ranging using wireless local area networking (WLAN) communication technology (e.g., IEEE 802.11/Wi-Fi based communication) and/or techniques based on WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102 and 104 may be any of a variety of types of wireless device. As one possibility, one or more of the wireless devices 102 and/or 104 may be a substantially portable wireless user equipment (UE) device, such as a smart phone, handheld device, a wearable device such as a smart watch, a tablet, a motor vehicle, or virtually any type of wireless device. As another possibility, one or more of the wireless devices 102 and/or 104 may be a substantially stationary device, such as a set top box, media player (e.g., an audio or audiovisual device), gaming console, desktop computer, appliance, door, access point, base station, or any of a variety of other types of device.

Each of the wireless devices 102 and 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102 and 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using one or more of LTE, CDMA2000 1×RTT, GSM, and/or 5G NR, and separate radios for communicating using each of Wi-Fi and Bluetooth. Other configurations are also possible.

As previously noted, aspects of this disclosure may be implemented in conjunction with the wireless communication system of FIG. 1A. For example, a wireless device (e.g., either of wireless devices 102 or 104) may transmit, to a neighboring wireless device, data packets based on a transmission schedule. The transmission schedule may include a timeout period associated with transmission of the data packets and/or a start time of the transmission schedule. The wireless device may receive, from the neighboring wireless device, a negative acknowledgement (NACK). The NACK may be based on an error condition such as non-receipt of any packet (e.g., data packets and/or non-data packets a QoS null packet, and/or a block ACK request packet) prior to expiration of the timeout period and/or detection of a gap in sequence numbers associated with the data packets. In some embodiments, the NACK may be (or include) a negative block ACK (N-BA) bitmap indicating which data packets were not successfully received.

In some embodiments, the wireless device may receive, from a neighboring wireless device, a transmission schedule associated with receipt of data packets from the neighboring wireless device. The transmission schedule may include a timeout period associated with transmission of the data packets and/or a start time of the transmission schedule. The wireless device may determine an error condition associated with the data packets. The error condition may be, for example, non-receipt of any packet (e.g., data packets and/or non-data packets a QoS null packet, and/or a block ACK request packet) prior to expiration of the timeout period and/or detection of a gap in sequence numbers associated with the data packets. The wireless device may, based on the error condition, transmit a NACK. In some embodiments, the NACK may be (or include) a negative block ACK (N-BA) bitmap indicating which data packets were not successfully received.

FIG. 1B illustrates an exemplary wireless device 100 (e.g., corresponding to wireless devices 102 and/or 104) that may be configured for use in conjunction with various aspects of the present disclosure. The device 100 may be any of a variety of types of device and may be configured to perform any of a variety of types of functionality. The device 100 may be a substantially portable device or may be a substantially stationary device, potentially including any of a variety of types of device. The device 100 may be configured to perform one or more ranging wireless communication techniques or features, such as any of the techniques or features illustrated and/or described subsequently herein with respect to any or all of the Figures.

As shown, the device 100 may include a processing element 10. The processing element may include or be coupled to one or more memory elements. For example, the device 100 may include one or more memory media (e.g., memory 105), which may include any of a variety of types of memory and may serve any of a variety of functions. For example, memory 105 could be RAM serving as a system memory for processing element 101. Other types and functions are also possible.

Additionally, the device 100 may include wireless communication circuitry 130. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 130 may include its own processing element (e.g., a baseband processor), e.g., in addition to the processing element 101. For example, the processing element 101 may be an 'application processor' whose primary function may be to support application layer operations in the device 100, while the wireless communication circuitry 130 may be a 'baseband processor' whose primary function may be to support baseband layer operations (e.g., to facilitate wireless communication between the device 100 and other devices) in the device 100. In other words, in some cases the device 100 may include multiple processing elements (e.g., may be a multi-processor device). Other configurations (e.g., instead of or in addition to an application processor/baseband processor configuration) utilizing a multi-processor architecture are also possible.

The device 100 may additionally include any of a variety of other components (not shown) for implementing device functionality, depending on the intended functionality of the device 100, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 100, such as processing element 101, memory 105, and wireless communication circuitry 130, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (and/or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 101, peripheral interfaces for communication with peripheral components within or external to device 100, etc.) may also be provided as part of device 100.

Figure 1C:
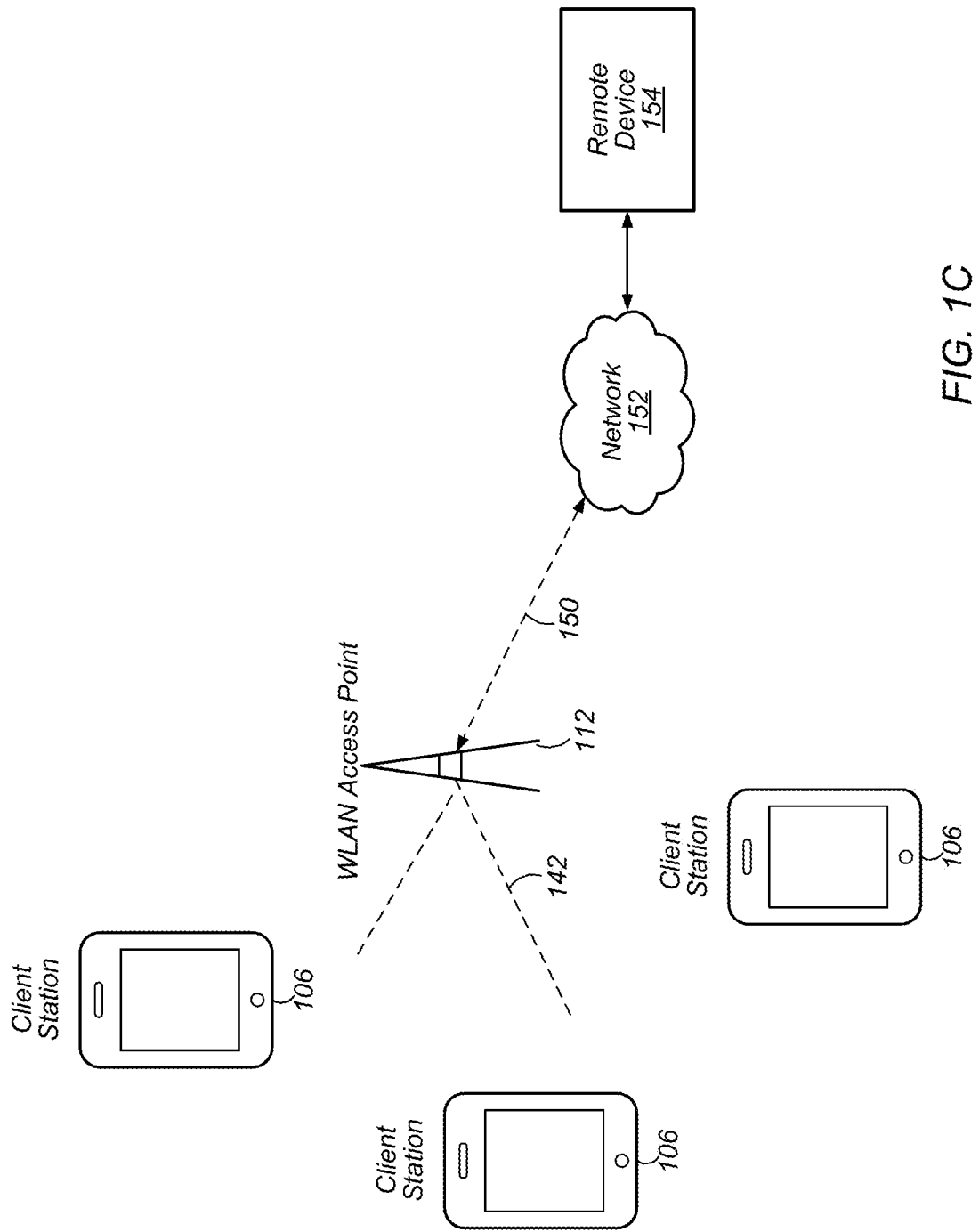
FIG. 1C illustrates an example WLAN communication system, according to some embodiments.

FIG. 1C—WLAN System

FIG. 1C illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152.

For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

Further, in some embodiments, as further described below, a wireless device 106 (which may be an exemplary implementation of device 100) may be configured to transmit, to a neighboring wireless device, data packets based on a transmission schedule. The transmission schedule may include a timeout period associated with transmission of the data packets and/or a start time of the transmission schedule. The wireless device may receive, from the neighboring wireless device, a negative acknowledgement (NACK). The NACK may be based on an error condition such as non-receipt of any packet (e.g., data packets and/or non-data packets a QoS null packet, and/or a block ACK request packet) prior to expiration of the timeout period and/or detection of a gap in sequence numbers associated with the data packets. In some embodiments, the NACK may be (or include) a negative block ACK (N-BA) bitmap indicating which data packets were not successfully received.

In some embodiments, the wireless device may receive, from a neighboring wireless device, a transmission schedule associated with receipt of data packets from the neighboring wireless device. The transmission schedule may include a timeout period associated with transmission of the data packets and/or a start time of the transmission schedule. The wireless device may determine an error condition associated with the data packets. The error condition may be, for example, non-receipt of any packet (e.g., data packets and/or non-data packets a QoS null packet, and/or a block ACK request packet) prior to expiration of the timeout period and/or detection of a gap in sequence numbers associated with the data packets. The wireless device may, based on the error condition, transmit a NACK. In some embodiments, the NACK may be (or include) a negative block ACK (N-BA) bitmap indicating which data packets were not successfully received.

Figure 2:
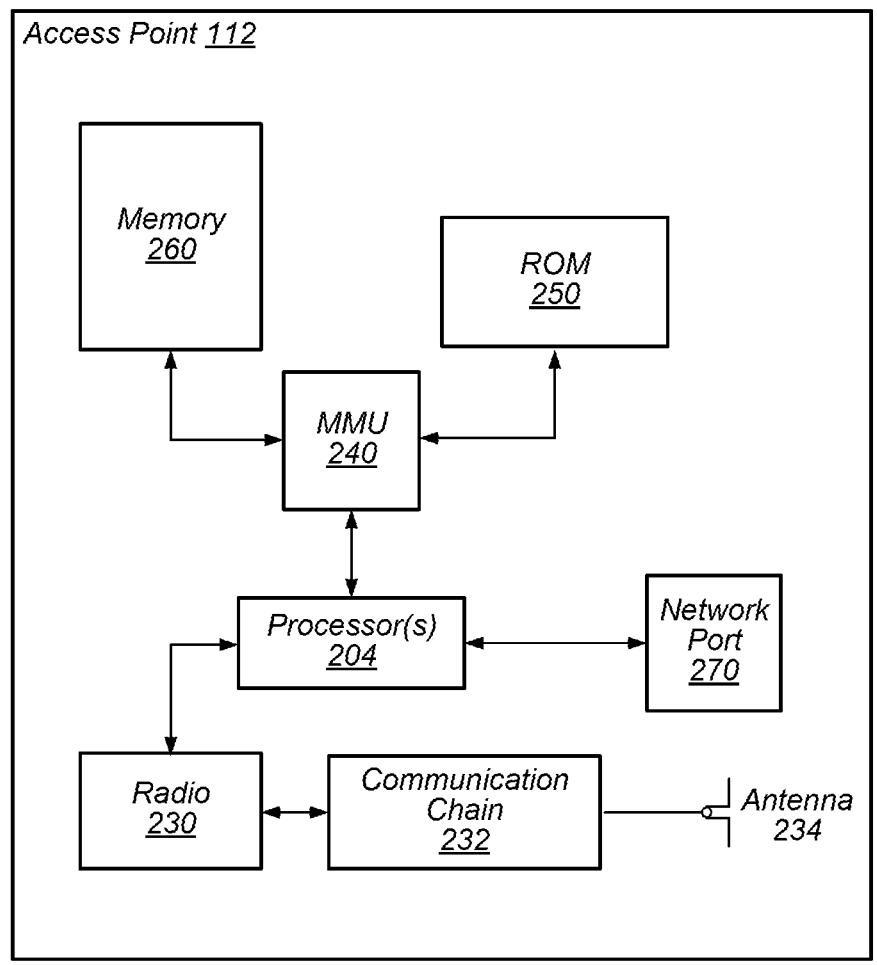
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112, which may be one possible exemplary implementation of the device 100 illustrated in FIG. 1B. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (and/or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, AP 112 may be configured to transmit, to a wireless device, data packets based on a transmission schedule. The transmission schedule may include a timeout period associated with transmission of the data packets and/or a start time of the transmission schedule. The AP 112 may receive, from the wireless device, a negative acknowledgement (NACK). The NACK may be based on an error condition such as non-receipt of any packet (e.g., data packets and/or non-data packets a QoS null packet, and/or a block ACK request packet) prior to expiration of the timeout period and/or detection of a gap in sequence numbers associated with the data packets. In some embodiments, the NACK may be (or include) a negative block ACK (N-BA) bitmap indicating which data packets were not successfully received.

In some embodiments, the AP 112 may receive, from a wireless device, a transmission schedule associated with receipt of data packets from the wireless device. The transmission schedule may include a timeout period associated with transmission of the data packets and/or a start time of the transmission schedule. The AP 112 may determine an error condition associated with the data packets. The error condition may be, for example, non-receipt of any packet (e.g., data packets and/or non-data packets a QoS null packet, and/or a block ACK request packet) prior to expiration of the timeout period and/or detection of a gap in sequence numbers associated with the data packets. The AP 112 may, based on the error condition, transmit a NACK. In some embodiments, the NACK may be (or include) a negative block ACK (N-BA) bitmap indicating which data packets were not successfully received.

Figure 3A:
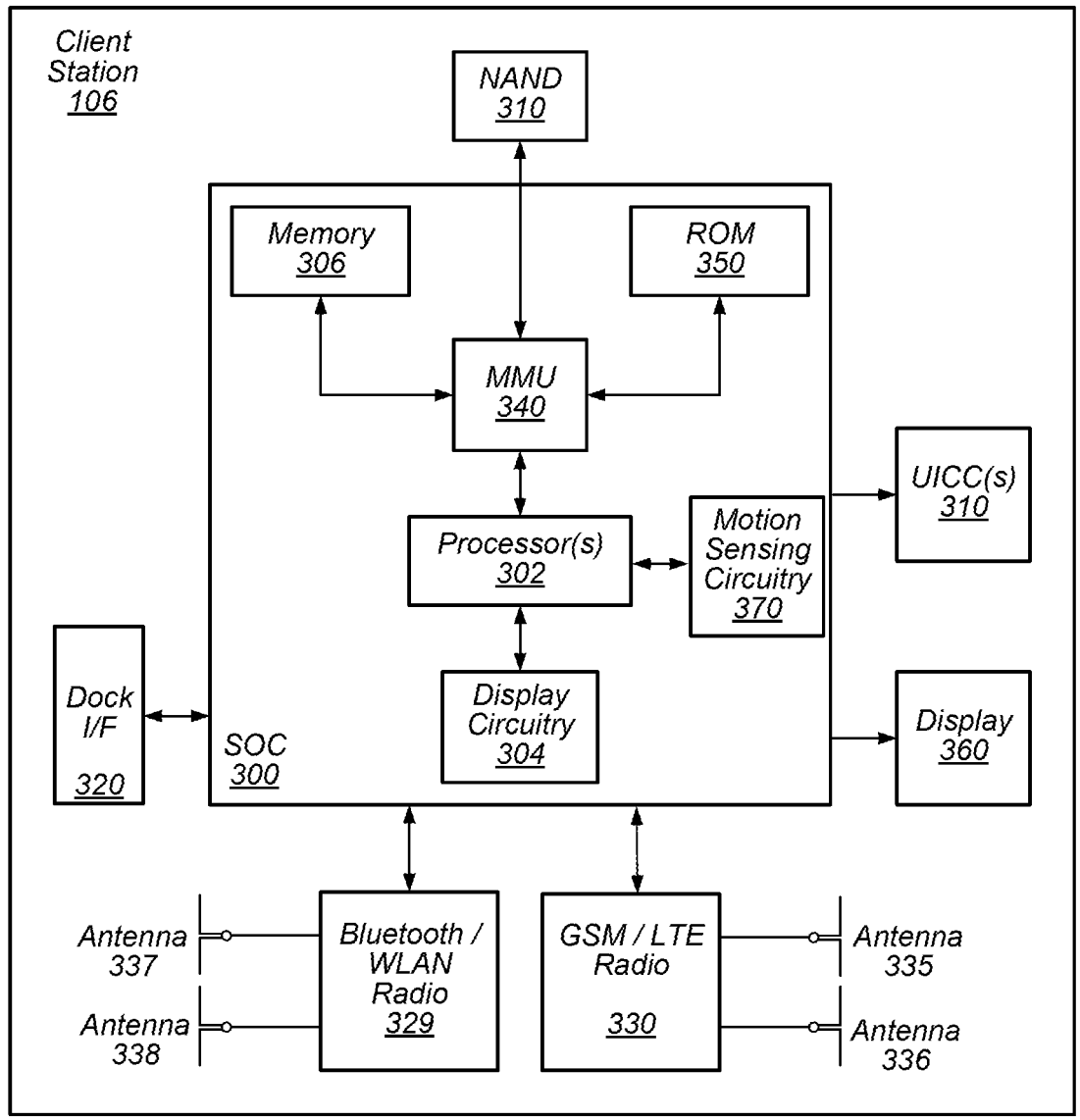
FIG. 3A illustrates an example simplified block diagram of a wireless station (UE), according to some embodiments.

FIG. 3A—Client Station Block Diagram

FIG. 3A illustrates an example simplified block diagram of a client station 106, which may be one possible exemplary implementation of the device 100 illustrated in FIG. 1B. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (and/or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration. Some or all components of the short to medium range wireless communication circuitry 329 and/or the cellular communication circuitry 330 may be used for ranging communications, e.g., using WLAN, Bluetooth, and/or cellular communications.

As shown, the SOC 300 may include processor(s) 302, which may execute program instructions for the client station 106 and display circuitry 304, which may perform graphics processing and provide display signals to the display 360. The SOC 300 may also include motion sensing circuitry 370 which may detect motion of the client station 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1C or for ranging as shown in FIG. 1A. Further, in some embodiments, as further described below, client station 106 may be configured to transmit, to a neighboring client station, data packets based on a transmission schedule. The transmission schedule may include a timeout period associated with transmission of the data packets and/or a start time of the transmission schedule. The client station 106 may receive, from the neighboring client station, a negative acknowledgement (NACK). The NACK may be based on an error condition such as non-receipt of any packet (e.g., data packets and/or non-data packets a QoS null packet, and/or a block ACK request packet) prior to expiration of the timeout period and/or detection of a gap in sequence numbers associated with the data packets. In some embodiments, the NACK may be (or include) a negative block ACK (N-BA) bitmap indicating which data packets were not successfully received.

In some embodiments, the client station 106 may receive, from a neighboring client station, a transmission schedule associated with receipt of data packets from the neighboring client station. The transmission schedule may include a timeout period associated with transmission of the data packets and/or a start time of the transmission schedule. The client station 106 may determine an error condition associated with the data packets. The error condition may be, for example, non-receipt of any packet (e.g., data packets and/or non-data packets a QoS null packet, and/or a block ACK request packet) prior to expiration of the timeout period and/or detection of a gap in sequence numbers associated with the data packets. The client station may, based on the error condition, transmit a NACK. In some embodiments, the NACK may be (or include) a negative block ACK (N-BA) bitmap indicating which data packets were not successfully received.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (and/or in addition), processor 302 may be configured as a programmable hardware element, such as an FPGA (Field Programmable Gate Array), or as an ASIC (Application Specific Integrated Circuit). Alternatively (and/or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

Figure 3B:
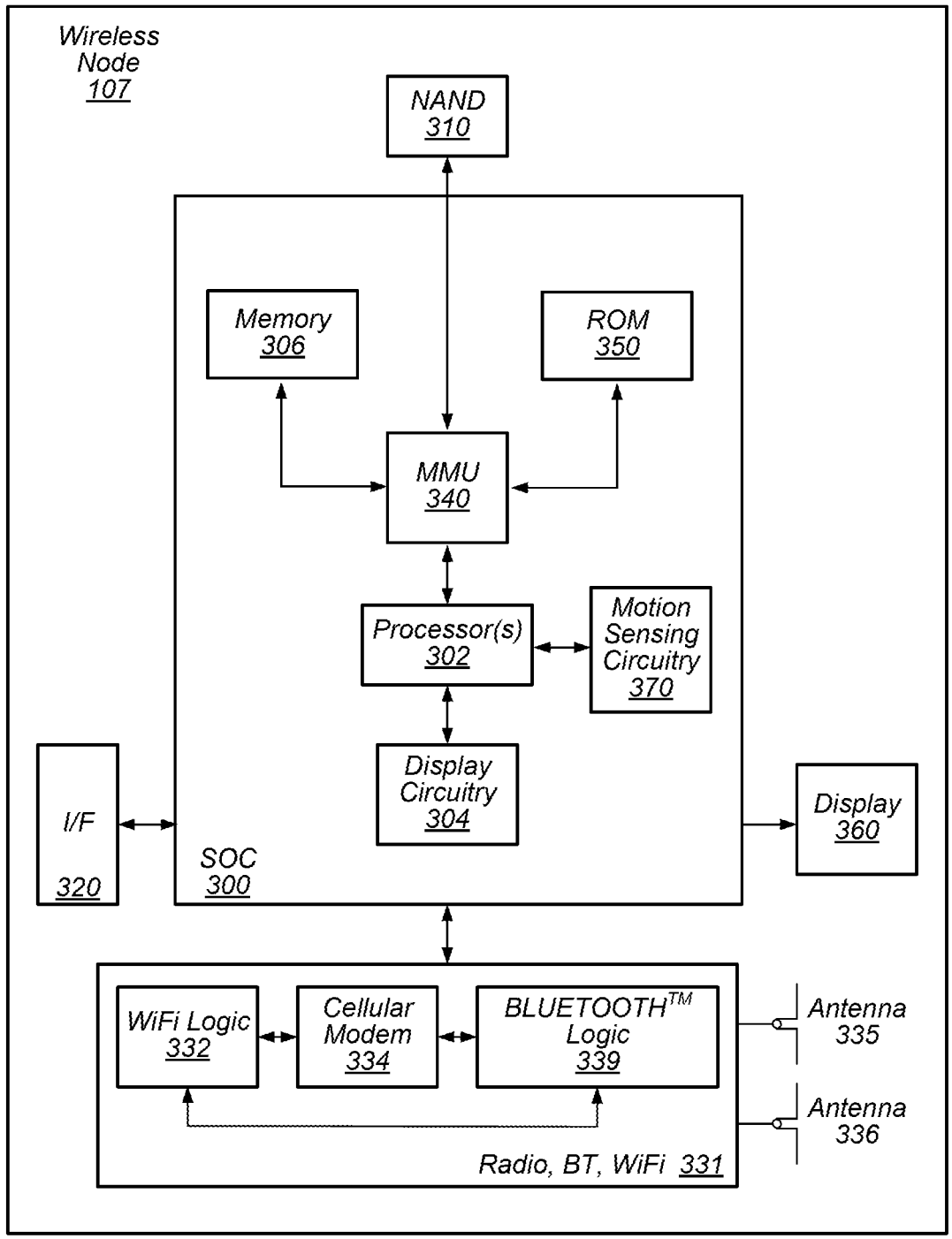
FIG. 3B illustrates an example simplified block diagram of a wireless node, according to some embodiments.

FIG. 3B—Wireless Node Block Diagram

FIG. 3B illustrates one possible block diagram of a wireless node 107, which may be one possible exemplary implementation of the device 100 illustrated in FIG. 1B. As shown, the wireless node 107 may include a system on chip (SOC) 300, which may include portions for various purposes. For example, as shown, the SOC 300 may include processor(s) 302 which may execute program instructions for the wireless node 107, and display circuitry 304 which may perform graphics processing and provide display signals to the display 360. The SOC 300 may also include motion sensing circuitry 370 which may detect motion of the wireless node 107, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the wireless node 107. For example, the wireless node 107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, NFC, GPS, etc.).

The wireless node 107 may include at least one antenna, and in some embodiments, multiple antennas 335 and 336, for performing wireless communication with base stations and/or other devices. For example, the wireless node 107 may use antennas 33 and 336 to perform the wireless communication. As noted above, the wireless node 107 may in some embodiments be configured to communicate wirelessly using a plurality of wireless communication standards or radio access technologies (RATs).

The wireless communication circuitry 331 may include Wi-Fi Logic 332, a Cellular Modem 334, and Bluetooth Logic 339. The Wi-Fi Logic 332 is for enabling the wireless node 107 to perform Wi-Fi communications, e.g., on an 802.11 network. The Bluetooth Logic 339 is for enabling the wireless node 107 to perform Bluetooth communications. The cellular modem 334 may be capable of performing cellular communication according to one or more cellular communication technologies. Some or all components of the wireless communication circuitry 331 may be used for ranging communications, e.g., using WLAN, Bluetooth, and/or cellular communications.

As described herein, wireless node 107 may include hardware and software components for implementing embodiments of this disclosure. For example, one or more components of the wireless communication circuitry 331 (e.g., Wi-Fi Logic 332) of the wireless node 107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit). For example, in some embodiments, as further described below, wireless node 107 may be configured to perform Wi-Fi Acknowledgment Mechanisms In some implementations of Wi-Fi, a "positive" acknowledgement (ACK) mechanism is used. A "positive" ACK means that an ACK or block ACK (BA) may be used to acknowledge reception of one or multiple packets received from a transmitting device. Thus, when there is no ACK or BA received by the transmitting device for one or multiple packets transmitted, the transmitting device may assume, in a Wi-Fi protocol (e.g., a Wi-Fi based network), that a packet (or multiple packets) is lost and therefore will retransmit unacknowledged packets. Note that whether the packet(s) was not received or whether the ACK was lost, the action taken by the transmitter is the same, e.g., retransmit the packet(s). Such a scheme may be feasible (acceptable) for unicast and/or for a small number of receivers in a multicast/broadcast network, however, in a very large network, where every packet is followed by an ACK or BA to confirm reception status (bitmap) of the individual packets, it may not be the most efficient operation For example, for a 1 millisecond packet broadcasted to 10 receivers, if each receiver replies with a BA with a duration of 68 microseconds, the total overhead of acknowledging the broadcast packet is 680 microseconds with may cause significant overhead and reduce the effective throughput significantly. In some instances, all packets have been successfully received, thus the overhead of the multiple Bas is purely overhead (e.g., unnecessary).

Embodiments described herein provide mechanisms for a negative acknowledgment (NACK) and/or a negative block acknowledgement (N-BA) based Wi-Fi protocol. In some embodiments, error detection mechanisms may be used by receivers to trigger NACKs and/or N-BAs. In some embodiments, transmission schedules may be setup between source and sink accommodate error detection. In some embodiments, a policy for transmitting NACKs and/or N-BAs may be defined. In some embodiments, processing of NACKs and/or N-BAs at a source may be defined. In some embodiments, signaling for setting up and/or indicating usage of NACKs and/or N-BAs, including a switch mechanism between using NACKs and/or N-BAs and ACKs and/or BAs may be defined.

Figure 4:
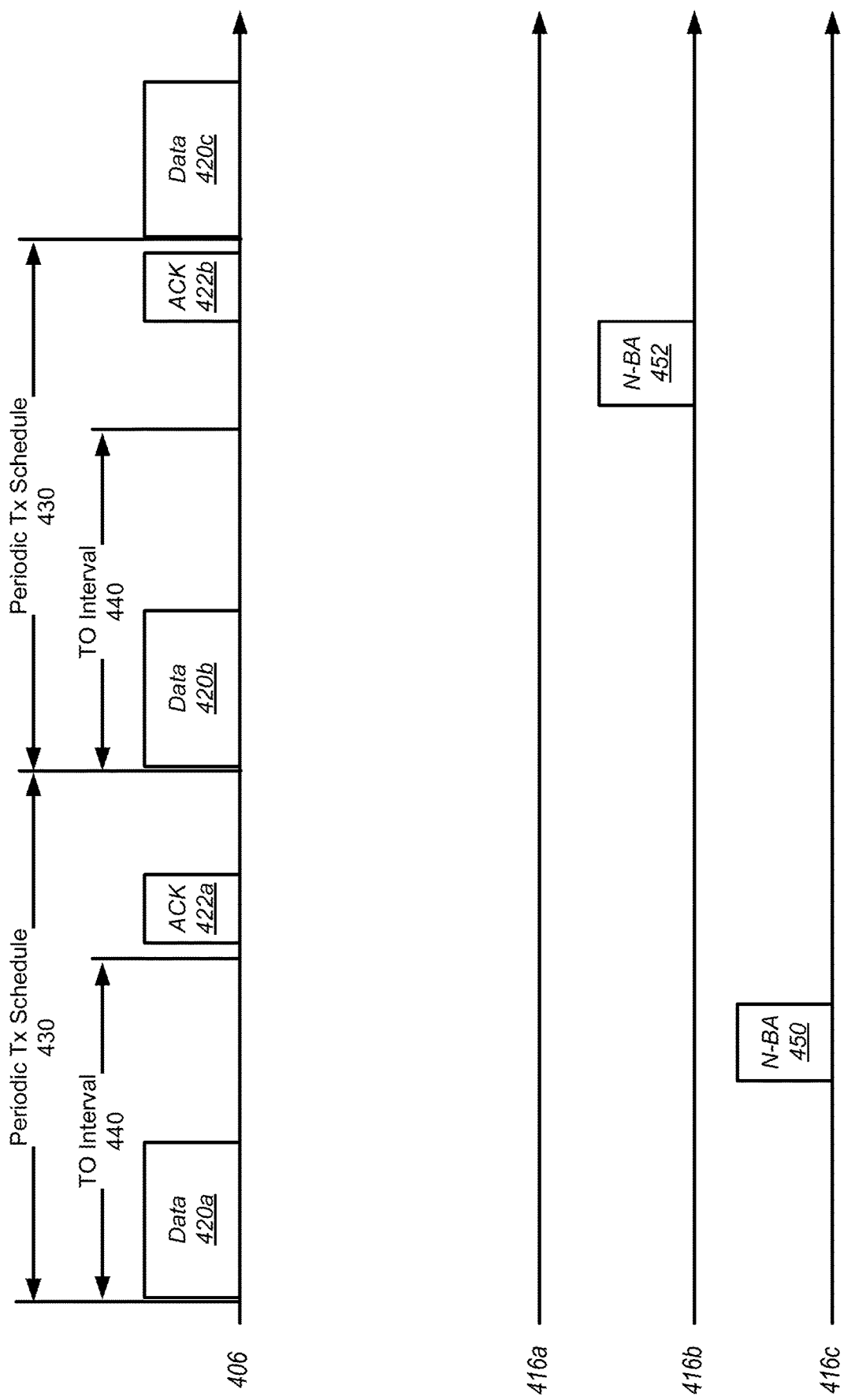
FIG. 4 illustrates an example of negative block acknowledgement transmission between devices in a Wi-Fi based network, according to some embodiments.

In some embodiments, contrary to existing block ACK mechanisms where an ACK or BA is always sent after data transmission, a NACK/N-BA may only be sent when a receiver detects an error. In some embodiments, an error detection mechanism may be based, at least in part, on detection of a gap in packet sequence number (note that in some embodiments, a transmitter may be required to transmit data in consecutive sequence numbers) and/or a timeout value based on a planned transmission schedule. For example, as illustrated by FIG. 4, a transmitting device, e.g., device 406 (which may be a wireless station 106) may transmit data 420*a-c* based on a periodic transmission schedule 430. The periodic transmission schedule 430 may be agreed upon (e.g., negotiated between) device 406 and one or more receiving devices, e.g., devices 416*a-c* (each of which may be a wireless station 106). As shown, device 406 may transmit data 420*a* to devices 416*a-c* and device 416*c* may detect a gap in the packet sequence number upon receiving data 420*a*. Thus, device 416*c* may assume there is an error in the reception of data 420*a* and may respond to device 406 with a negative block ACK (e.g., N-BA 450). Note that devices 416*a* and 416*b* may successfully receive data 420*a*, thus there may be no response sent from these devices to device 406. Upon receiving N-BA 450, device 406 may process the negative block ACK (e.g., ACK 422*a*). Additionally, as shown, periodic transmission schedule 430 may include a time out interval 440 (e.g., an agreed upon and/or negotiated timeout value based on the periodic transmission schedule). Thus, as shown, device 406 may transmit data 420*b* to devices 416*a-c* and device 416*b* may not receive data 420*b* prior to expiration of the timeout interval 440. Thus, device 416*b* may assume there is an error in the reception of data 420*b* and may respond to device 406 with a negative block ACK (e.g., N-BA 452), e.g., after expiration of the timeout interval 440. Note that devices 416*a* and 416*c* may successfully receive data 420*b*, thus there may be no response sent from these devices to device 406. Upon receiving N-BA 452, device 406 may process the negative block ACK (e.g., ACK 422*b*).

In some embodiments, a transmission schedule may be setup between a source device (e.g., a wireless station 106) providing (transmitting) data and a sink device (e.g., another wireless station 106) consuming (receiving) data. e.g., to inform the sink device when data should be transmitted from the source device. In some embodiments, IEEE 802.11ax target wakeup time (TWT) protocol frame may be modified to indicate a start time and timeout value for receiving a scheduled transmission. In some embodiments, a TWT start time may be modified to indicate a scheduled transmission time. In some embodiments, a TWT service period may be modified to indicate a timeout value. In some embodiments, if the sink does not receive a transmission from the source within the timeout value, the sink may can assume the data (e.g., data packet) is lost and thus, the sink may transmit a negative ACK (and/or negative BA) to the source. For example, a TWT protocol packet format may be modified such that a "Target Wake Time" field refers to (and/or indicates) a source's scheduled transmission start time. Additionally, in some embodiments, a "Nominal minimum TWT Wake Duration" field and "TWT Wake Interval Mantissa" field, which together define a TWT service period (SP) duration, may be modified to define (and/or indicate) a transmission timeout value. In some embodiments, if, within a source's transmission timeout duration, the source does not have any data packets to transmit, the source may transmit a non-data packet such as a quality of service (QoS) null data packet to inform the sink that the source has no data packets to transmit. Alternatively, and/or in addition, if the source does not have any data packets to transmit within the transmission timeout duration, the source may transmit a non-data packet such as a block ACK request packet to the sink in order to synchronize sequence numbers between the source and sink to avoid the sink transmitting a negative block ACK.

Figure 5A:
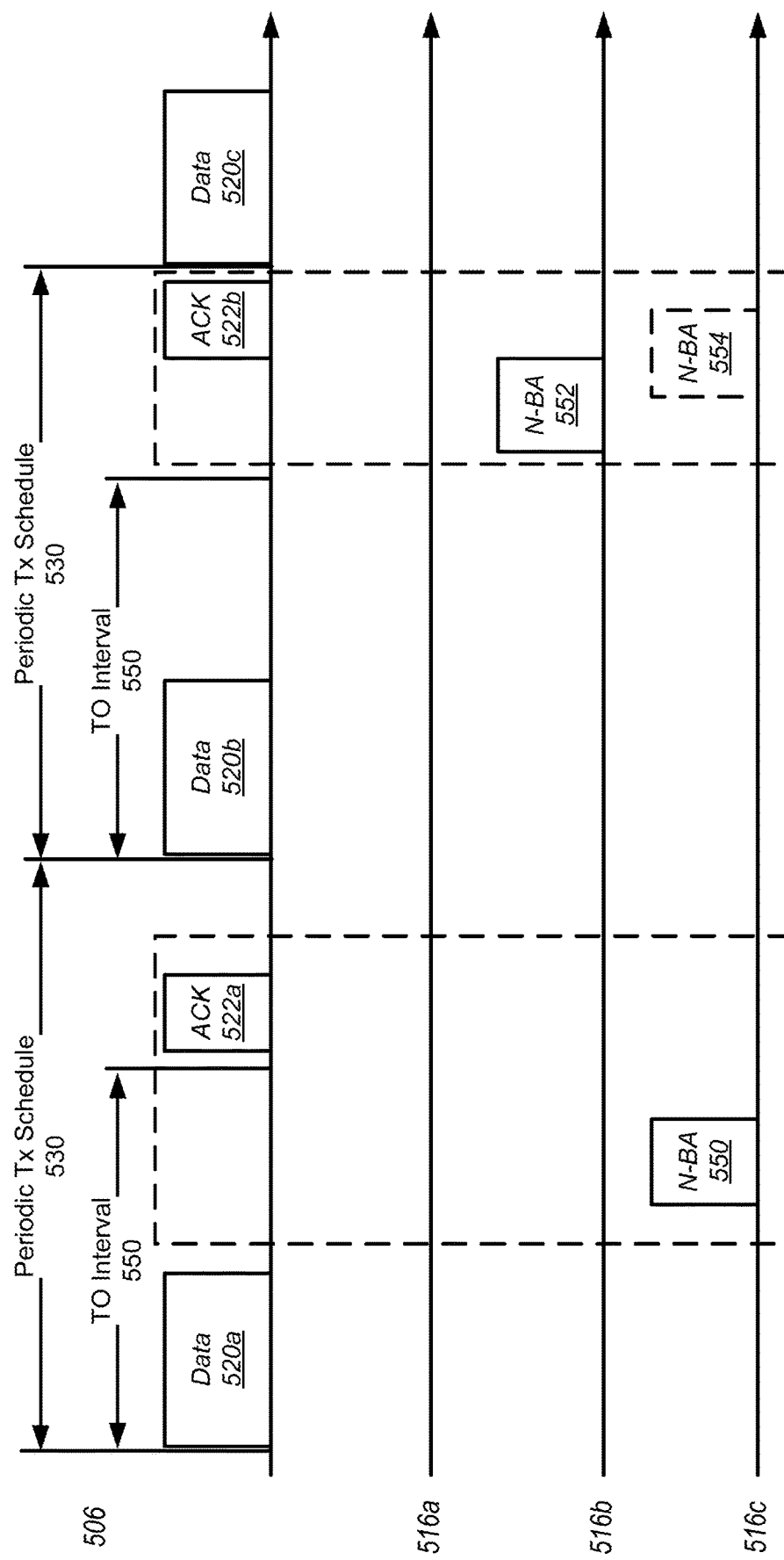
FIGS. 5A and 5B illustrate examples of a sink suppressing (and/or cancelling) transmission of an N-BA, according to some embodiments.
Figure 5B:
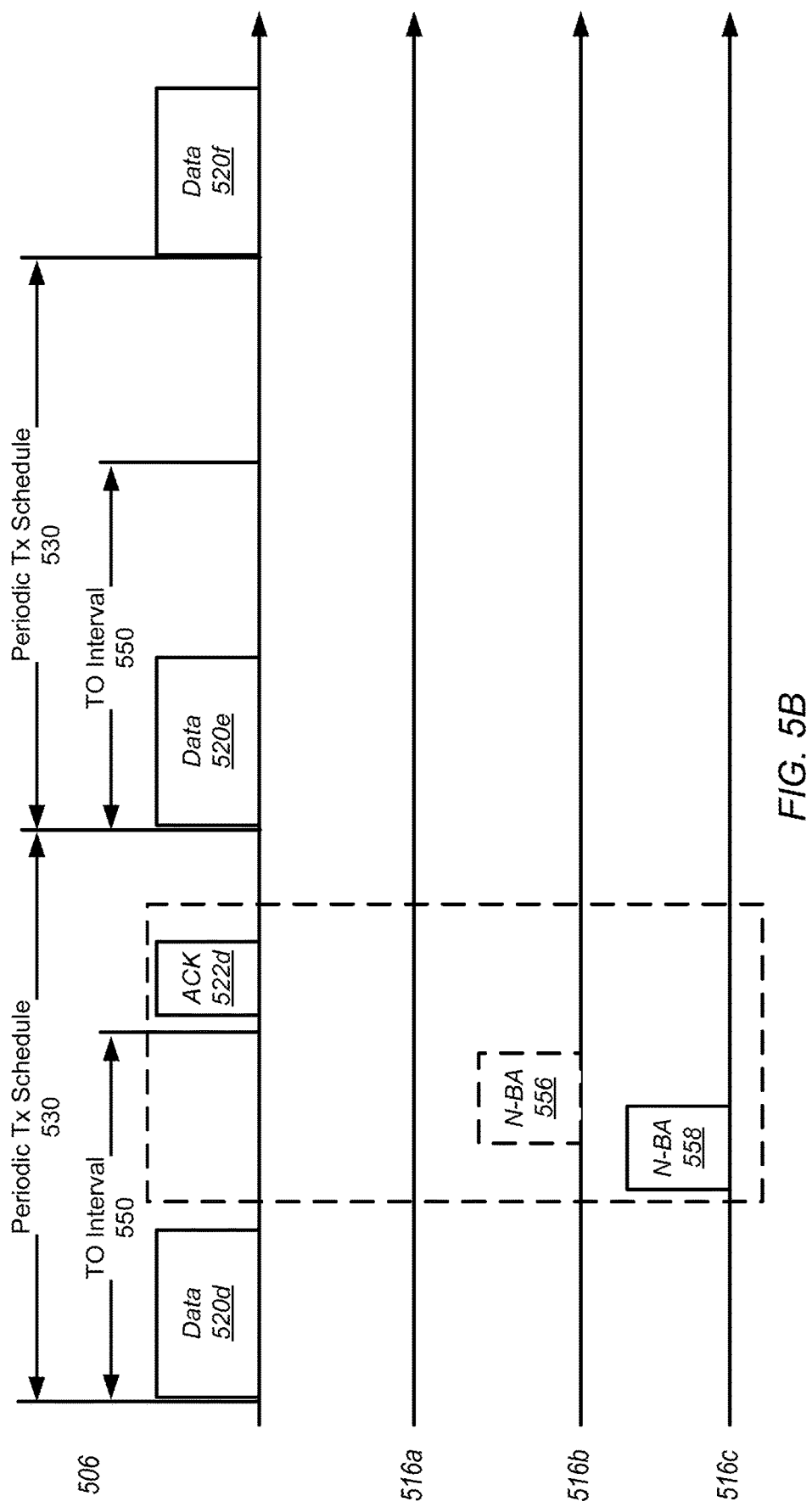

In some embodiments, to further minimize a number of N-BAs transmitted over the air, if a sink detects that an N-BA has been transmitted by (or from) another sink, the sink may cancel its own N-BA transmission. In some embodiments, the sink may only cancel its own N-BA transmission if the N-BA transmitted by another sink indicates error status for error packets that the sink intends to include in its N-BA. Note that in some embodiments, transmission of the N-BA may be assigned a highest priority access category (e.g., access category voice (AC_VO), e.g., in order to ensure transmission of the N-BA as soon as possible. [94] For example, FIGS. 5A and 5B illustrate examples of a sink suppressing (and/or cancelling) transmission of an N-BA, according to some embodiments. As shown in FIG. 5A, a transmitting device (or source device), e.g., device 506 (which may be a wireless station 106) may transmit data 520a-c based on a periodic transmission schedule 530. The periodic transmission schedule 530 may be agreed upon (e.g., negotiated between) device 506 and one or more receiving devices (e.g., sink devices), e.g., devices 516a-c (each of which may be a wireless station 106). As shown, device 506 may transmit data 520a to devices 516a-c and device 516c may detect a gap in a packet sequence number upon receiving data 520a. Thus, device 516c may assume there is an error in the reception of data 520a and may respond to device 506 with a negative block ACK (e.g., N-BA 550). Note that devices 516a and 516b may successfully receive data 520a, thus there may be no response sent from these devices to device 506. Upon receiving N-BA 550, device 506 may process the negative block ACK (e.g., ACK 522a). Additionally, as shown, periodic transmission schedule 530 may include a time out interval 550 (e.g., an agreed upon and/or negotiated timeout value based on the periodic transmission schedule). Thus, as shown, device 506 may transmit data 520b to devices 516a-c and device 516b may not receive data 520b prior to expiration of the timeout interval 550. Thus, device 516b may assume there is an error in the reception of data 520b and may respond to device 506 with a negative block ACK (e.g., N-BA 552), e.g., after expiration of the timeout interval 550. In addition, device 516c may also assume, based on expiration of the timeout interval 550, that there is an error in the reception of data 520b and may prepare a response to device 506, e.g., via N-BA 554. However, upon detection (receipt) of N-BA 552 transmitted by device 516b, device 516c may determine to suppress N-BA 552, e.g., to reduce and/or mitigate over-the-air congestion and/or traffic. Note that device 516a may successfully receive data 520b, thus there may be no response sent from this device to device 506. Upon receiving N-BA 552, device 506 may process the negative block ACK (e.g., ACK 522b).

As shown in FIG. 5B, device 506 may continue transmitting data (e.g., data 520d-f) to devices 516a-516c according to periodic transmission schedule 530. In particular, devices 516b and 516c may detect a gap in a packet sequence number upon receiving data 520d. Note that a gap detected by device 516b may differ from a gap detected by device 516c. Each device may assume there is an error in the reception of data 520d and may attempt to respond to device 506 with an N-BA (e.g., N-BAs 556 and 558). Thus, device 516c may transmit N-BA 558 to device 506 indicating a gap in sequence packet sequence numbers detected by device 516c. Further, upon detection of N-BA 558, device 516b may determine to suppress (or cancel transmission of) N-BA 556, e.g., to reduce and/or mitigate over-the-air congestion and/or traffic. Note that suppression of N-BA 556 may occur even if device 516b detected a different gap in sequence numbers as compared to device 516c. Note further that device 516a may successfully receive data 520b, thus there may be no response sent from this device to device 506. Upon receiving N-BA 558, device 506 may process the negative block ACK (e.g., ACK 522d).

In some embodiments, a source device (e.g., such as devices 406 and/or 506) may interpret a bitmap included in an N-BA based on a 1 in the bitmap indicating successful reception of a packet and a 0 in the bitmap indicating an error in reception of a packet. Note that the bitmap may be based on the transmitted data (e.g., an aggregated medium access control (MAC) protocol data unit (PDU). In some embodiments, a response to the N-BA (e.g., ACKs 422a-b and/or 522a-b, d) may include an acknowledgment frame that may indicate receipt of the N-BA. In some embodiments, a response to the N-BA (e.g., ACKs 422a-b and/or 522a-b, d) may include indicated missed packets with a transmission rate based on a transmission rate of the N-BA.

In some embodiments, prior to transmission of data, a source device (e.g., such as devices 406 and/or 506) may reserve a channel for a potential duration of a sink's N-BA transmissions. For example, the source device may setup a network allocation vector (NAV) to cover a periodic transmission window, thereby quieting other devices on the channel and allowing medium access to the sink device for possible N-BA transmissions. In some embodiments, sink devices (e.g., devices 416a-c and/or 516a-c) may record NAV information and identify that a channel reservation is from an associated source (e.g., devices 406 and/or 506) and may transmit N-BA regardless of the NAV information. In some embodiments, a sink may use a transmitted "BSS color" field (e.g., basic service set (BSS) color may mark shared frequencies to allow determination of whether simultaneous use of spectrum is permissible) from a packet to identify whether it should keep the channel reservation from this packet or ignore such information. In some embodiments, a transmission of multicast data from the source and corresponding N-BAs may use access category AC_VO (e.g., a highest priority access category). In some embodiments, more aggressive access parameters (e.g., such as smaller contention window size) may also be used. In some embodiments, the source may use a multicast data transmission, a control frame such as a clear to send (CTS)-To-Self frame (e.g., a protection mechanism to avoid collisions), and/or QoS null frame to reserve the channel.

In some embodiments, a negative block ACK frame format may include a field (or parameter) "BA Type", e.g., as illustrated by FIGS. 6A-B, to indicate ACK type. For example, as shown, such a field (or parameter) may indicate, either via bit 4 of BA Type (e.g., FIG. 6A) or bit 5 (e.g., FIG. 6B) of BA Type, that an ACK frame is a negative block ACK frame. In some embodiments, a N-BA session setup may include exchange of add block ACK (ADDBA) request and response action frames. In some embodiments, a "Block ACK Policy" field of an ADDBA frame may be used to indicate whether or not the block ACK with be a negative BA. In some embodiments, a field value of 0 may indicate an N-BA session setup whereas a field value of 1 may indicate a BA session setup. In some embodiments, devices (e.g., sources and sinks) may use differing traffic indicators (TIDs) for block ACK and negative block ACK session setup. For example, during block ACK session setup by exchanging ADDBA request and response, a TID may be set to 3 and a "Block ACK Policy" field may be set to 0, thereby indicating that TID corresponding to a value of 3 is using a negative BA.

Figure 7:
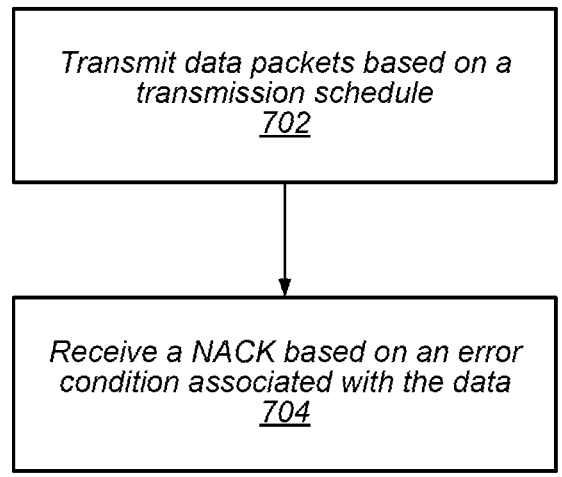
FIG. 7 illustrates a block diagram of an example of a method for negative acknowledgements in a Wi-Fi based network, according to some embodiments.

FIG. 7 illustrates a block diagram of an example of a method for negative acknowledgements in a Wi-Fi based network, according to some embodiments. The method shown in FIG. 7 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 702, a wireless device, such as wireless station 106, may transmit, to a neighboring wireless device (which may be another wireless station 106), data packets based on and/or in accordance with a transmission schedule. The transmission schedule may include a timeout period associated with transmission of the data packets. In some embodiments, the transmission schedule may also include a start time of the transmission schedule. In some embodiments, an IEEE 802.11ax target wakeup time (TWT) protocol frame may indicate the start time of the transmission schedule. In some embodiments, the start time may be indicated by a target wake time field of a TWT protocol packet. In some embodiments, an IEEE 802.11ax TWT frame may indicate the time out period. In some embodiments, the timeout period may be defined by a nominal minimum TWT wake duration field and a TWT wake interval mantissa field of a TWT protocol packet. In some embodiments, when the wireless device does not have data to transmit during a scheduled transmission opportunity of the transmission schedule, the wireless device may transmit a non-data packet to the neighboring wireless device, e.g., to maintain the transmission schedule and/or to avoid a NACK from the neighboring wireless device due to expiration of the timeout period for the scheduled transmission opportunity. For example, in some embodiments, the non-data packet may be a quality of service (QoS) null data packet. As another example, the non-data packet may be a block ACK request packet. In some embodiments, the block ACK request packet may synchronize sequence numbers between the wireless device and the neighboring wireless device. In some embodiments, the wireless device may exchange, with the neighboring wireless device, add block ACK (ADDBA) frames prior to transmitting the data packets, wherein the ADDBA frames indicate usage of NACKs. In some embodiments, the usage of NACKs may be indicated via a block ACK policy field of the ADDBA frames.

At 704, the wireless device may receive, from the neighboring wireless device, a negative acknowledgement (NACK). The NACK may be based on an error condition such as non-receipt of any packet (e.g., data packets and/or non-data packets such as a QoS null packet, and/or a block ACK request packet) prior to expiration of the timeout period or detection of a gap in sequence numbers associated with the data packets. In other words, the error condition may include non-receipt of one or more packets. In some embodiments, the NACK may be (or include) a negative block ACK (N-BA) bitmap indicating which data packets were not successfully received. In some embodiments, the data packets and NACK (and/or N-BA) may be designated with a highest priority access category. In some embodiments, the highest access category designation may be voice (AC_VO).

In some embodiments, the wireless device may reserve, prior to transmitting data packets, a channel for transmission of the data packets. In some embodiments, the channel may be reserved to accommodate transmission of the NACK from the neighboring wireless device. In some embodiments, to reserve the channel, the wireless device may set up of a network allocation vector, perform a multicast data transmission, transmit a control frame, and/or transmit a quality of service (QoS) null frame. In some embodiments, the control frame may be a clear to send (CTS)-to-self frame.

Figure 8:
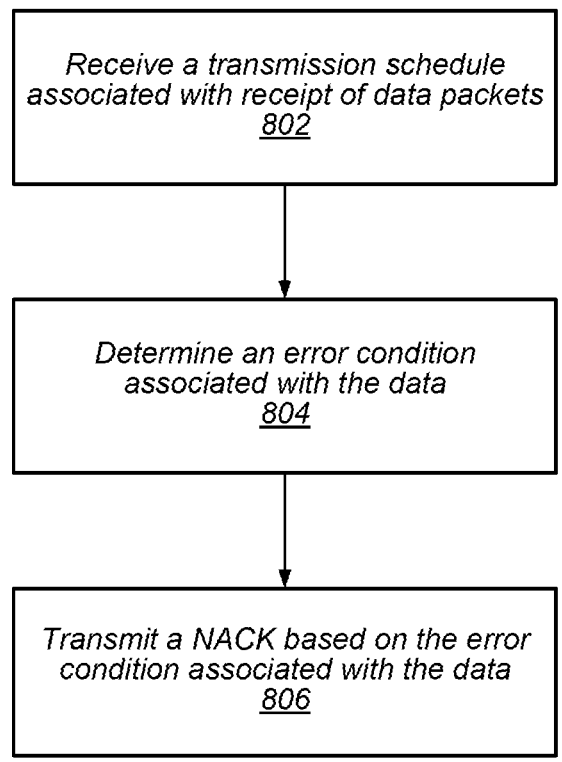
FIG. 8 illustrates a block diagram of another example of a method for negative acknowledgements in a Wi-Fi based network, according to some embodiments.

FIG. 8 illustrates a block diagram of another example of a method for negative acknowledgements in a Wi-Fi based network, according to some embodiments. The method shown in FIG. 8 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 802, a wireless device, such as wireless station 106, may receive, from a neighboring wireless device (which may be another wireless station 106), a transmission schedule associated with receipt of data packets from the neighboring wireless device. The transmission schedule may include a timeout period associated with transmission of the data packets. In some embodiments, the transmission schedule may also include a start time of the transmission schedule. In some embodiments, an IEEE 802.11ax target wakeup time (TWT) protocol frame may indicate the start time of the transmission schedule. In some embodiments, the start time may be indicated by a target wake time field of a TWT protocol packet. In some embodiments, an IEEE 802.11ax TWT frame may indicate the time out period. In some embodiments, the timeout period may be defined by a nominal minimum TWT wake duration field and a TWT wake interval mantissa field of a TWT protocol packet. In some embodiments, when the neighboring wireless device does not have data to transmit during a scheduled transmission opportunity of the transmission schedule, the wireless device may receive, from the neighboring wireless device, a non-data packet, e.g., to maintain the transmission schedule and/or to avoid a NACK from the neighboring wireless device due to expiration of the timeout period for the scheduled transmission opportunity. For example, in some embodiments, the non-data packet may be a quality of service (QoS) null data packet. As another example, the non-data packet may be a block ACK request packet. In some embodiments, the block ACK request packet may synchronize sequence numbers between the wireless device and the neighboring wireless device. In some embodiments, the wireless device may exchange, with the neighboring wireless device, add block ACK (ADDBA) frames prior to transmitting the data packets, wherein the ADDBA frames indicate usage of NACKs. In some embodiments, the usage of NACKs may be indicated via a block ACK policy field of the ADDBA frames.

At 804, the wireless device may determine an error condition associated with the data. In some embodiments, the error condition may be non-receipt of any packet (e.g., data packets and/or non-data packets a QoS null packet, and/or a block ACK request packet) prior to expiration of the timeout period and/or detection of a gap in sequence numbers associated with the data packets. In other words, the error condition may include non-receipt of one or more packets. In some embodiments, the wireless device may determine that an other wireless device has transmitted a NACK to the neighboring wireless device and may cancel transmission of a NACK to be transmitted by the wireless device. In some embodiments, to determine that the other wireless device has transmitted the NACK may include the wireless device receiving the NACK from the other wireless device and comparing the received NACK to the wireless device's NACK. The wireless device may, based on the comparison, cancel its NACK, e.g., when the NACKs do not differ in error indications.

At 806, the wireless device may transmit a NACK based on the error condition. In some embodiments, the NACK may be (or include) a negative block ACK (N-BA) bitmap indicating which data packets were not successfully received. In some embodiments, the data packets and NACK (and/or N-BA) may be designated with a highest priority access category. In some embodiments, the highest access category designation may be voice (AC_VO).

In some embodiments, a channel may be reserved for transmission of the data packets. In some embodiments, the channel reservation may accommodate transmission of the NACK from the wireless device. In some embodiments, to reserve the channel, the neighboring wireless device may set up of a network allocation vector, perform a multicast data transmission, transmit a control frame, and/or transmit a quality of service (QoS) null frame. In some embodiments, the control frame may be a clear to send (CTS)-to-self frame.

Further Embodiments

In some embodiments, a method for negative acknowledgements in a Wi-Fi based network may include a wireless device (e.g. such as client station 106):
transmitting, to a neighboring wireless device, data packets based on a transmission schedule, wherein the transmission schedule includes a timeout period associated with transmission of the data packets; and
receiving, from the neighboring wireless device, a negative acknowledgement (NACK), wherein the NACK may be based on an error condition which may include at least one of non-receipt of any packet transmitted from the wireless device to the neighboring wireless device prior to expiration of the timeout period and/or detection of a gap in sequence numbers associated with the data packets.

In some embodiments, the NACK may include a negative block ACK (N-BA) bitmap indicating which data packets were not successfully received.

In some embodiments, an IEEE 802.11ax target wakeup time (TWT) protocol frame may indicate a start time of the transmission schedule.

In some embodiments, a start time of the transmission schedule may be indicated by a target wake time field of a target wakeup time (TWT) protocol packet.

In some embodiments, the timeout period may be defined by a nominal minimum target wakeup time (TWT) wake duration field and a TWT wake interval mantissa field of a TWT protocol packet.

In some embodiments, when the wireless device does not have data to transmit during a scheduled transmission opportunity of the transmission schedule, the method may further include the wireless device transmitting a non-data packet to the neighboring wireless device. In some embodiments, the non-data packet may include at least one of quality of service (QoS) null data packet and/or a block ACK request packet. In some embodiments, the block ACK request packet may synchronize sequence numbers between the wireless device and neighboring wireless device.

In some embodiments, the method may further include the wireless device reserving, prior to transmitting data packets, a channel for transmission of the data packets. In some embodiments, the channel may be reserved to accommodate transmission of the NACK from the neighboring wireless device. In some embodiments, reserving the channel may include the wireless device performing at least one of:
set up of a network allocation vector;
a multicast data transmission,
transmission of a control frame; and/or
transmission of a quality of service (QoS) null frame.

In some embodiments, the control frame may be a clear to send (CTS)-to-self frame.

In some embodiments, the data packets and NACK may be designated with a highest priority access category. In some embodiments, the highest access category designation may be voice (AC_VO).

In some embodiments, the method may further include the wireless device exchanging, with the neighboring wireless device, add block ACK (ADDBA) frames prior to transmitting the data packets. In some embodiments, the ADDBA frames indicate usage of NACKs. In some embodiments, the usage of NACKs may be indicated via a block ACK policy field of the ADDBA frames.

In some embodiments, a wireless device may include:
at least one antenna;
at least one radio communicatively coupled to the antenna and configured to perform wireless communications according to at least one radio access technology (RAT);
at least one processor communicatively coupled to the at least one radio, wherein the wireless device may be configured to perform voice and/or data communications;
wherein the at least one processor may be configured to cause the wireless device to perform the method.

In some embodiments, an apparatus may include:
a memory; and at least one processor in communication with the memory, wherein the at least one processor may be configured to perform the method.

In some embodiments, a non-transitory computer readable memory medium storing program instructions executable by processing circuitry of a wireless device to perform the method.

In some embodiments, a method for negative acknowledgements in a Wi-Fi based network may include a wireless device (e.g., such as client station 106):
  receiving, from a neighboring wireless device, a transmission schedule associated with receipt of data packets from the neighboring wireless device, wherein the transmission schedule may include a transmission start time and a timeout period associated with transmission of the data packets;
  determining an error condition associated with the data packets, wherein the error condition may include at least one of non-receipt of any packet from the neighboring wireless device prior to expiration of the timeout period or detection of a gap in sequence numbers associated with the data packets; and
  transmitting, to the neighboring wireless device, a negative acknowledgement (NACK), wherein the NACK may be based on the error condition.

In some embodiments, the NACK may include a negative block ACK (N-BA) bitmap indicating which data packets were not successfully received.

In some embodiments, an IEEE 802.11ax target wakeup time (TWT) protocol frame may indicate a start time of the transmission schedule.

In some embodiments, an IEEE 802.11ax target wakeup time (TWT) protocol frame may indicate the timeout period.

In some embodiments, a start time of the transmission schedule may be indicated by a target wake time field of a target wakeup time (TWT) protocol packet.

In some embodiments, the timeout period may be defined by a nominal minimum target wakeup time (TWT) wake duration field and/or a TWT wake interval mantissa field of a TWT protocol packet.

In some embodiments, when the neighboring wireless device does not have data to transmit during a scheduled transmission opportunity of the transmission schedule, the method may further include the wireless device receiving a non-data packet from the neighboring wireless device. In some embodiments, the non-data packet may include at least one of a quality of service (QoS) null data packet and/or a block ACK request packet. In some embodiments, the block ACK request packet may synchronize sequence numbers between the wireless device and neighboring wireless device.

In some embodiments, a channel for transmission of the data packets may be reserved to accommodate transmission of the NACK.

In some embodiments, the data packets and NACK may be designated with a highest priority access category. In some embodiments, the highest access category designation may be voice (AC_VO).

In some embodiments, the method may further include the wireless device, exchanging, with the neighboring wireless device, add block ACK (ADDBA) frames prior to reception of the data packets. In some embodiments, the ADDBA frames indicate usage of NACKs. In some embodiments, the usage of NACKs may be indicated via a block ACK policy field of the ADDBA frames.

In some embodiments, the method may further include the wireless device:
  determining that an other wireless device has transmitted a NACK to the neighboring wireless device; and
  cancelling transmission of the wireless device's NACK.

In some embodiments, determining that the other wireless device has transmitted the NACK may include the wireless device:
  receiving the NACK from the other wireless device;
  comparing the received NACK to the wireless device's NACK; and
  cancelling, when the NACKs do not differ in error indications, the transmission of the wireless device's NACK.

In some embodiments a wireless device may include:
  at least one antenna;
  at least one radio communicatively coupled to the antenna and configured to perform wireless communications according to at least one radio access technology (RAT);
  at least one processor communicatively coupled to the at least one radio, wherein the wireless device may be configured to perform voice and/or data communications;
  wherein the at least one processor may be configured to cause the wireless device to perform the method.

In some embodiments an apparatus may include:
  a memory; and
  at least one processor in communication with the memory, wherein the at least one processor may be configured to perform a method.

In some embodiments, a non-transitory computer readable memory medium storing program instructions executable by processing circuitry of a wireless device to perform the method.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device may be configured to include a processor (and/or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
at least one antenna;
at least one radio communicatively coupled to the antenna and configured to perform wireless communications according to at least one radio access technology (RAT);
at least one processor communicatively coupled to the at least one radio, wherein the wireless device is configured to perform voice and/or data communications; and
wherein the at least one processor is configured to cause the wireless device to:
transmit, to a neighboring wireless device, data packets in accordance with a transmission schedule, wherein the transmission schedule includes a timeout period associated with transmission of the data packets, and wherein the timeout period is defined by a nominal minimum target wakeup time (TWT) wake duration field and a TWT wake interval mantissa field of a TWT protocol packet received from another wireless device; and
receive, from the neighboring wireless device, a negative acknowledgement (NACK), wherein the NACK is based on an error condition comprising at least non-receipt of one or more data packets transmitted from the wireless device to the neighboring wireless device prior to expiration of the timeout period.

2. The wireless device of claim 1,
wherein the NACK comprises a negative block ACK (N-BA) bitmap indicating the one or more data packets that were not successfully received.

3. The wireless device of claim 1,
wherein an IEEE 802.11ax TWT protocol frame indicates a start time of the transmission schedule.

4. The wireless device of claim 1,
wherein, when the wireless device does not have data to transmit during a scheduled transmission opportunity of the transmission schedule, the at least one processor is further configured to cause the wireless device to transmit a non-data packet to the neighboring wireless device.

5. The wireless device of claim 4,
wherein the non-data packet comprises a block ACK request packet.

6. The wireless device of claim 1,
wherein the at least one processor is further configured to cause the wireless device to:
reserve, prior to transmitting data packets, a channel for transmission of the data packets, wherein the channel is reserved to accommodate transmission of the NACK from the neighboring wireless device, wherein reserving the channel comprises the wireless device performing at least one of:
set up of a network allocation vector;
a multicast data transmission;
transmission of a control frame; or
transmission of a quality of service (QoS) null frame.

7. The wireless device of claim 6,
wherein the control frame comprises a clear to send (CTS)-to-self frame.

8. The wireless device of claim 1,
wherein the at least one processor is further configured to cause the wireless device to:
exchange, with the neighboring wireless device, one or more add block ACK (ADDBA) frames prior to transmitting the data packets, wherein the one or more ADDBA frames indicate usage of NACKs via a block ACK policy field.

9. The wireless device of claim 1,
wherein the error condition further comprises detection of a gap in sequence numbers associated with the data packets.

10. An apparatus, comprising:
a memory; and
at least one processor in communication with the memory, wherein the at least one processor is configured to:
generate instructions to transmit, to a neighboring wireless device, data packets based on a transmission schedule that includes a timeout period associated with transmission of the data packets, and wherein the timeout period is defined by a nominal minimum target wakeup time (TWT) wake duration field and a TWT wake interval mantissa field of a TWT protocol packet received from another wireless device; and
receive, from the neighboring wireless device, a negative block acknowledgement (N-BA), wherein the N-BA is based on an error condition comprising non-receipt of one or more data packets from the neighboring wireless device prior to expiration of the timeout period, and wherein the N-BA includes a bitmap that indicates one or more data packets that were not successfully received.

11. The apparatus of claim 10,
wherein an IEEE 802.11ax TWT protocol frame indicates the timeout period.

12. The apparatus of claim 10,
wherein the data packets and the N-BA are designated with a highest priority access category.

13. The apparatus of claim 12,
wherein the highest access category designation comprises voice (AC_VO).

14. The apparatus of claim 10,
wherein a start time of the transmission schedule is indicated by a target wake time field of a TWT protocol packet.

15. A non-transitory computer readable memory medium storing program instructions executable by processing circuitry of a wireless device to:
receive, from a neighboring wireless device, a transmission schedule associated with receipt of data packets from the neighboring wireless device, wherein the transmission schedule includes a timeout period associated with transmission of the data packets, wherein the timeout period is defined by a nominal minimum target wakeup time (TWT) wake duration field and a TWT wake interval mantissa field of a TWT protocol packet received from another wireless device;
determine an error condition associated with the data packets, wherein the error condition comprises non-receipt of one or more data packets from the neighboring wireless device prior to expiration of the timeout period; and generate a negative acknowledgement (NACK) for transmission to the neighboring wireless device, wherein the NACK is based on the error condition.

16. The non-transitory computer readable memory medium of claim 15,
wherein, when the neighboring wireless device does not have data to transmit during a scheduled transmission opportunity of the transmission schedule, the program instructions are further executable by the processing circuitry of the wireless device to receive a non-data packet from the neighboring wireless device.

17. The non-transitory computer readable memory medium of claim 16,
wherein the non-data packet comprises at least one of a block ACK request packet configured to synchronize sequence numbers between the wireless device and neighboring wireless device.

18. The non-transitory computer readable memory medium of claim 15,
wherein the program instructions are further executable by the processing circuitry of the wireless device to:
determine that an other wireless device has transmitted a NACK to the neighboring wireless device; and
cancel transmission, by the wireless device, of the NACK.

19. The wireless device of claim 5,
wherein the block ACK request packet is configured to synchronize sequence numbers between the wireless device and neighboring wireless device.

20. The apparatus of claim 10,
wherein the error condition further comprises detection of a gap in sequence numbers associated with the data packets.

* * * * *